United States Patent [19]
Kawai

[11] Patent Number: 6,144,362
[45] Date of Patent: Nov. 7, 2000

[54] IMAGE DISPLAYING AND CONTROLLING APPARATUS AND METHOD

[75] Inventor: Toshihiko Kawai, Chiba, Japan

[73] Assignee: Sony Corporation, Tokyo, Japan

[21] Appl. No.: 08/932,149

[22] Filed: Sep. 17, 1997

[30] Foreign Application Priority Data

Sep. 27, 1996 [JP] Japan ................................... 8-256836

[51] Int. Cl.⁷ .................................................. G09G 5/00
[52] U.S. Cl. ......................... 345/115; 345/114; 345/116; 348/445; 348/443; 348/563; 348/564; 348/565
[58] Field of Search .................................... 345/115, 114, 345/113, 116, 119, 133, 24, 23; 348/563, 564, 565, 566, 567, 568, 552, 445, 443, 458, 557, 475, 447; H04N 5/445; G09G 5/00

[56] References Cited

U.S. PATENT DOCUMENTS

| | | | |
|---|---|---|---|
| 5,027,212 | 6/1991 | Marlton et al. | 348/564 |
| 5,153,720 | 10/1992 | Kawai | 358/105 |
| 5,349,385 | 9/1994 | Glenn | 348/445 |
| 5,504,535 | 4/1996 | Abe | 348/568 |
| 5,504,536 | 4/1996 | Yatomi et al. | 348/563 |
| 5,510,843 | 4/1996 | Keene et al. | 348/446 |
| 5,621,469 | 4/1997 | Monta et al. | 348/563 |
| 5,631,710 | 5/1997 | Kamogawa et al. | 348/564 |
| 5,796,442 | 8/1998 | Gove et al. | 348/564 |

*Primary Examiner*—Nathan Flynn
*Assistant Examiner*—Vivek Srivastava
*Attorney, Agent, or Firm*—Limbach & Limbach L.L.P.

[57] ABSTRACT

A image displaying and controlling apparatus for displaying a computer graphics image in square-shaped pixels in an MPEG2 image format in rectangular-shaped pixels at a regular roundness. A graphics processor block produces the data of 640×480 pixels, two-line data of which are stored in two 1H buffers, and are multiplied respectively by weights output by a weight control circuit through a line conversion circuit. As a result, data of 640×432 are produced. A delay circuit delays a vertical synchronizing signal output by the graphics processor block by 14H. A phase comparator circuit compares the 14H delayed vertical synchronizing signal in phase with a vertical synchronizing signal output by an MPEG2 video decoder. The timing of the generation of the vertical synchronizing signal at the graphics processor block is set to be earlier by 14H than the timing of the generation of the vertical synchronization signal of the MPEG2 video decoder. The memory capacity required of the buffers in front of the line conversion circuit in a processing circuit is for two lines only while line conversion process is performed without any destruction of pixel data.

6 Claims, 14 Drawing Sheets

IMAGE-PRESENT AREA  VISIBLE AREA

IMAGE PRESENT AREA  VISIBLE AREA

IMAGE DISPLAYING AND CONTROLLING APPARATUS AND METHOD

BACKGROUND OF THE INVENTION

1. Field of the Invention

The present invention relates to an image displaying and controlling apparatus and method and, more particularly, to an image displaying and controlling apparatus and method in which a roundness is assured when an image constructed of square-shaped pixels and having one aspect ratio is displayed as a second image constructed of rectangular-shaped pixels and having the other aspect ratio.

2. Description of the Related Art

Home television receivers or display monitors (NTSC television CRT display monitors are hereinafter simply referred to as TV monitors) have a large dot pitch and a slow screen refresh rate (30 frames per second). When an attempt is made to present on the TV monitor a graphics image produced in a personal computer, the presented image becomes coarser than the corresponding one on the display monitor of the personal computer. Thus, a proper image cannot be reproduced on the TV monitor.

If a TV monitor, possibly installed in a living room, is able to present a graphics image produced in a personal computer, both a television image and a computer graphics image can be presented using the same monitor. To this end, a VGA/NTSC scan converter is used. The scan converter first writes, onto a frame memory, image data fed by the personal computer, reads the image data at the vertical synchronizing frequency of the television receiver, and converts the image data into a composite video signal to be displayed on the TV monitor.

If the scan converter having the frame memory is built in a personal computer, the overall cost of the personal computer will be pushed up.

Alternatively, a personal computer may be equipped with a DVD (Digital Versatile Disc) player. The DVD player reproduces a bit stream in an MPEG (Moving Picture Expert Group) 2 format and the reproduced data is decoded through an MPEG2 decoder to be presented on a TV monitor.

In the above methods, the following problems will arise if a graphics image produced in the personal computer is overlaid on the image decoded by the MPEG2 decoder (referred to as MPEG2 image).

Digital coding rules of component signals in the current television system are formulated in Recommendation ITU-R (International Telecommunication Union Radio Communication Sector) BT. 601. This Recommendation specifies the sampling frequency, quantization level, and the like in the conversion of the analog signals of luminance and color difference into digital signals.

According to ITU-R BT. 601, the sampling frequency is 13.5 MHz, and the number of effective pixels for luminance signal per (scanning) line is 720. On the other hand, the NTSC Standard specifies that one frame is constructed of 525 lines. Out of these, the number of effective lines actually presented on screen is about 480.

According to MP@ML (MainProfile@Main Level), MPEG2, which is the International Standard ISO/ITC (International Organization for Standardization/ International Electrotechnical Commission) 13818, 720 pixels/line, 576 lines/frame and 30 frames/s are specified.

The MPEG2 image is constructed of pixel data of 720×480 dots. The MPEG2 decoder alternately outputs an odd field image data constructed of 720×240 dots and an even field image data constructed of 720×240 dots in an interlace scanning system, at a rate of 60 fields a second. An MPEG2 image of 720×480 dots is thus displayed at a rate of 30 frames a second. Each dot constituting the image on screen is called a picture element or a pixel.

If an MPEG2 image of 720×480 pixels (having an aspect ratio of 3:2) is presented on the TV monitor having an aspect ratio of 4:3, the image is presented on screen with each pixel appearing as a rectangular pixel having its longer side vertically oriented.

Not all 720×480 pixels in the MPEG2 image are shown on the TV monitor, and an approximately 10% overscan area is provided in each of the vertical and horizontal directions. Actually visible on screen are about 648×432 pixels. FIG. 12A shows the relationship between a visible area and an image-present but invisible area (the overscan area).

The computer graphics image according to the well-known VGA (Video Graphics Array), which was formulated by IBM as the graphics standard for IBM PC AT and their compatible machines, includes 640×480 pixels in one frame. As shown in FIG. 12B, the VGA image is presented on screen with its all pixel visible on the display monitor.

If the VGA image is presented on the TV monitor having an aspect ratio of 4:3, each pixel is presented as a square pixel because the image of 640×480 pixels constituting the VGA image is equivalently a 4:3 aspect image.

As shown in FIG. 11, when the MPEG2 image of 720×480 pixels is presented on the TV monitor is mixed with the VGA image of 640×480 pixels in an overlay fashion, the VGA image is shown elongated vertically because of the aspect ratio difference. In other words, the roundness of image is not 1.

Referring to FIG. 13, the VGA image of 640×480 pixels is line-number converted from 480 lines to 432 lines so that the VGA image has the same aspect ratio of 4:3 as that of the MPEG2 image, and is then mixed with the MPEG2 image. In this way, the VGA image is presented in the regular roundness.

When the VGA image is presented after being converted from 480 lines to 432 lines, the number of lines has to be halved to 216 to be compatible with the interlace scanning system.

Referring to FIG. 14, removing the top 12 lines and bottom 12 lines from one field MPEG2 image constructed of 240 lines results in 216 lines, and if one field VGA image in the interlace scanning system is presented over the 216 lines, the VGA image will be overlaid on the MPEG2 image in the regular roundness.

These 216 lines are generated by processing the image data of the lines in the vicinity of the 480 lines in a VGA image in a non-interlace scanning system. Suppose that the scanning of the non-interlaced VGA image is performed twice the rate of scanning of the NTSC system, the non-interlaced VGA image is scanned at a rate of 480 lines per field. The interlaced VGA image of 216 lines per field may be obtained by processing a non-interlaced VGA image of 480 lines.

As shown in FIG. 14, the lines within an area of r of the 216 lines in an interlaced VGA image may be produced from the lines within an area R of the 480 lines in a non-interlaced VGA image. As can be seen from FIG. 14, at the timing of producing the lines within the area r, the lines within the area R are not yet supplied. For this reason, the non-interlaced VGA image is once stored in a frame memory, and out of the image stored, the image data corresponding to the lines within the area is read to produce the lines of the interlaced VGA image.

The use of a frame memory for line number conversion pushes up the cost of the apparatus.

SUMMARY OF THE INVENTION

Accordingly, it is an object of the present invention to provide an image displaying and controlling apparatus that is low cost and presents a computer graphics image on a TV monitor in a regular roundness.

According to a first aspect of the present invention, the image displaying and controlling apparatus for displaying a first image having a first aspect ratio as a second image having a second aspect ratio comprises memory means for storing pixel data of said first image on a unit of horizontal line basis, a line number converter means for converting line number comprising one display image of said first image so as to display said first image in said second aspect ratio by processing image data of at least two lines stored in said memory means, and timing controller means for controlling storing operation timing of said memory means so that said first image is not broken down in converting process by said line number converter means.

According to a second aspect of the present invention, the image displaying and controlling method for displaying a first image having a first aspect ratio as a second image having a second aspect ratio, said method comprising the steps of storing pixel data of said first image on a unit of horizontal line basis, converting line number comprising one display image of said first image so as to display said first image in said second aspect ratio by processing image data of at least two lines stored in said storing step and controlling storing operation timing of said storing step so that said first image is not broken down in said converting step.

In the image displaying and controlling apparatus and method according to the first and second aspects of the present invention, image data for at least two lines are processed to convert the number of lines constituting one screen so that the first image is presented in the second aspect ratio. A memory capacity as large as the one for storing the image data for at least two lines is sufficient, and a low-cost design is thus achieved.

DESCRIPTION OF THE PREFERRED EMBODIMENTS

Figure 1:
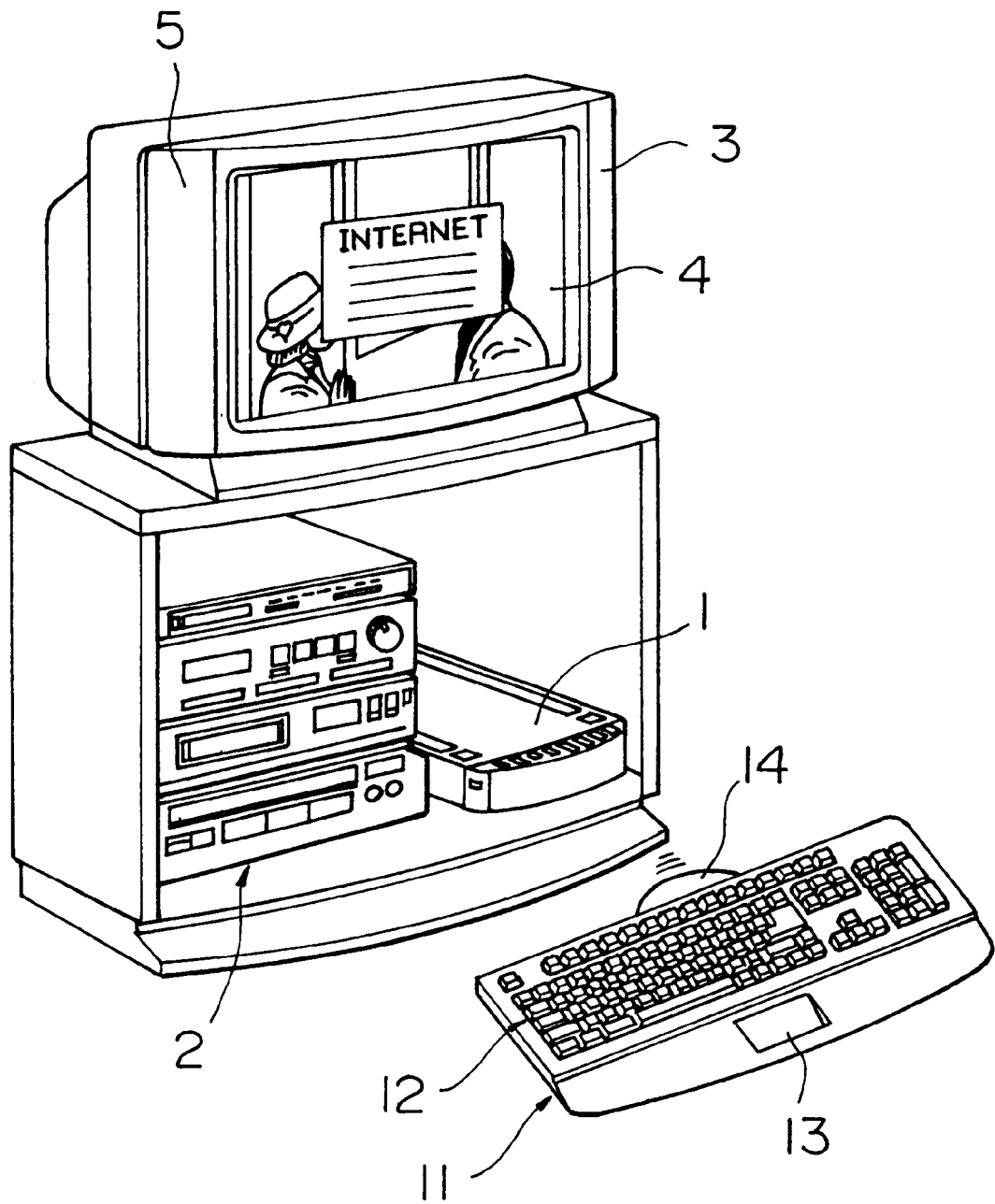
FIG. 1 is a perspective view of an AV (audio-visual) system in which the image displaying and controlling apparatus of the present invention is incorporated.

FIG. 1 shows one example of an AV (audio-visual) system in which the image displaying and controlling apparatus of the present invention is incorporated. As shown, a personal computer 1, along with an AV apparatus 2 including a tuner, an amplifier, and a video disc player, is connected to a television receiver 3. The television receiver 3 comprises a CRT 4 for presenting an image and a loudspeaker 5 for outputting a sound.

A keyboard 11 comprises a plurality of keys 12 and a touchpad 13, and is designed to emit an infrared signal corresponding to the operation of each of them to the personal computer 1 from its infrared transmitter 14.

Figure 2:
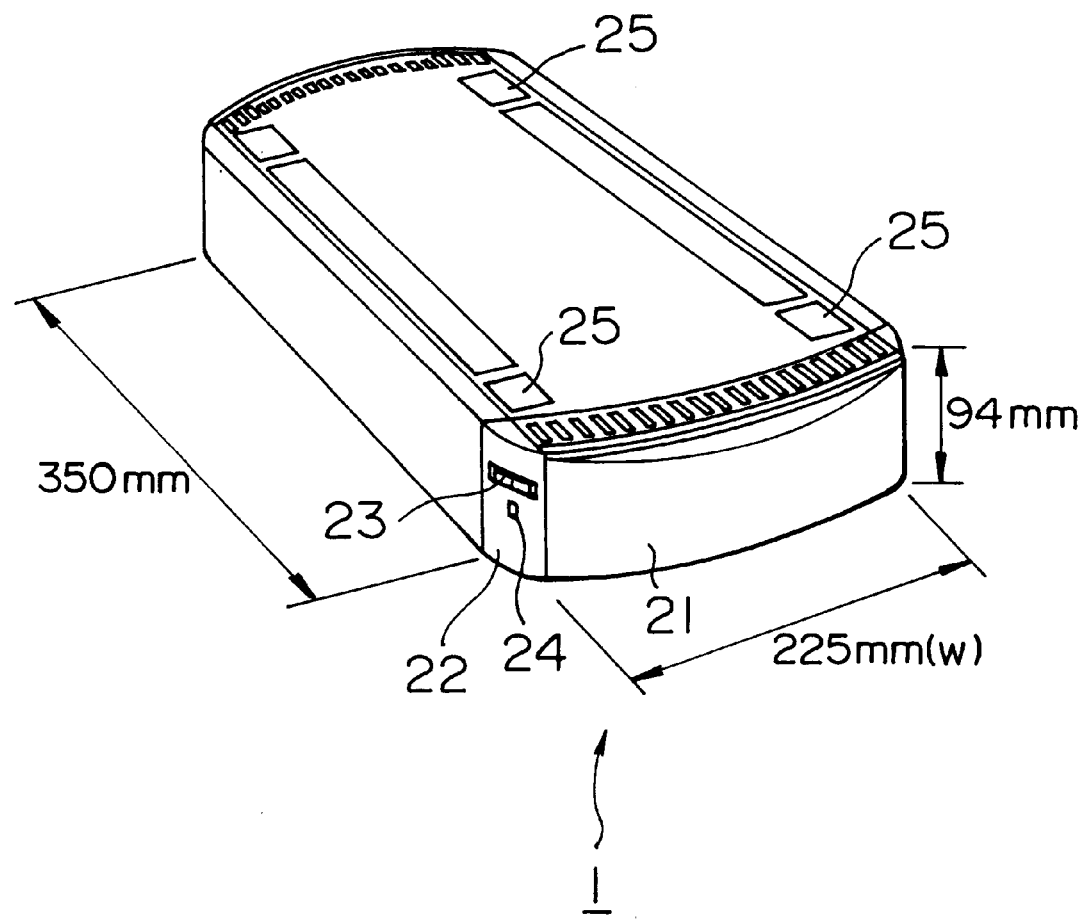
FIG. 2 is a front perspective view of the personal computer shown in FIG. 1.

FIG. 2 is an external view of the personal computer 1. The dimensions of the personal computer 1 are 225 mm wide by 94 mm high by 350 mm deep. The personal computer 1 is provided with a flip-down door 21 and panels 22 on both sides of the door 21. Disposed on the left-hand side panel in FIG. 2 are a power switch 23 for turning on or off power and an infrared receiver 24 for receiving an infrared signal emitted by the infrared transmitter 14 in the keyboard 11.

The personal computer 1 has, on its top surface, socket sections 25 which receive the feet of a peripheral device so that it is reliably placed on to of the personal computer 1 if the peripheral device is interfaced thereto.

Figure 3:
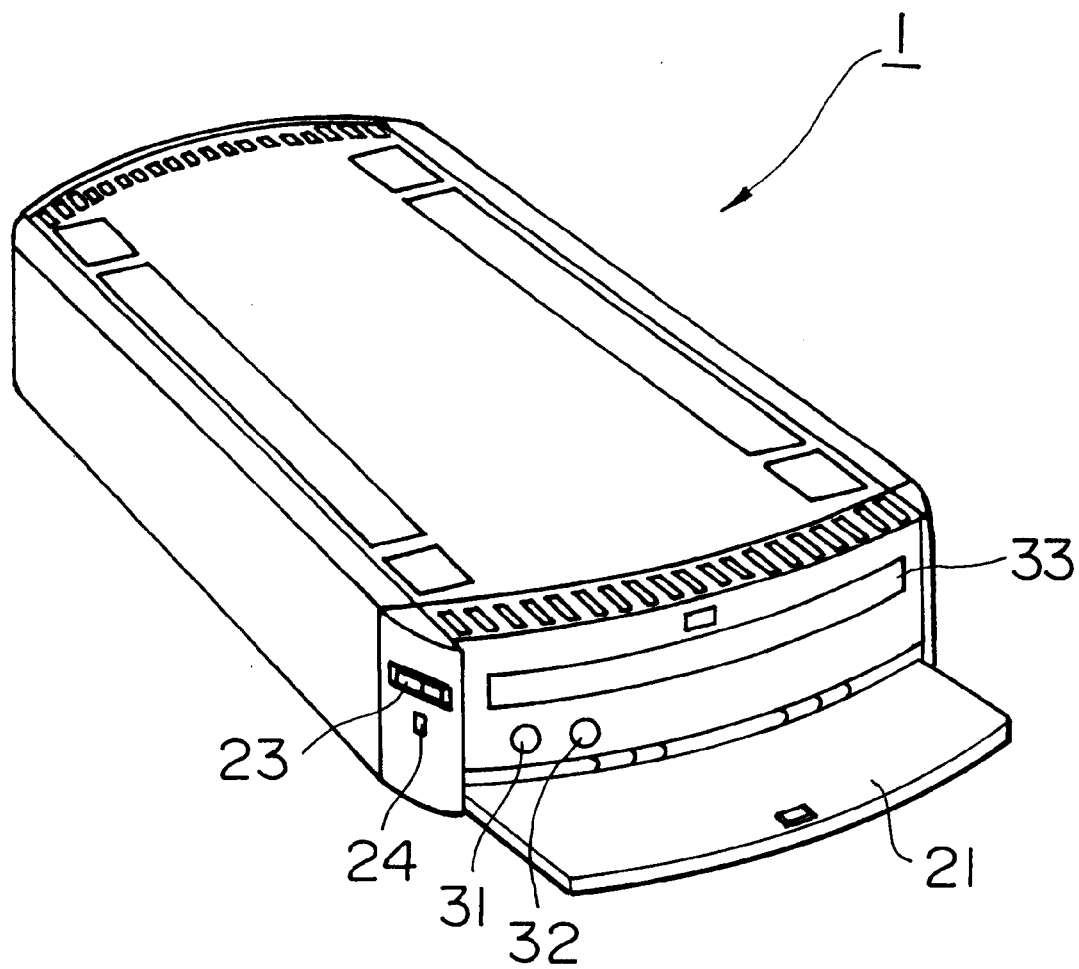
FIG. 3 is a perspective view of the personal computer of FIG. 2 with its door opened.

FIG. 3 shows the personal computer 1 with its door 21 opened. With the door 21 opened as shown, the DVD (Digital Versatile Disc) drive 33 is seen. Disposed below the DVD drive 33 are a USB terminal 31 as a serial interface and a 1394 terminal 32 conforming to the IEEE (Institute of Electrical and Electronics Engineers) 1394 Standard.

Figure 4:
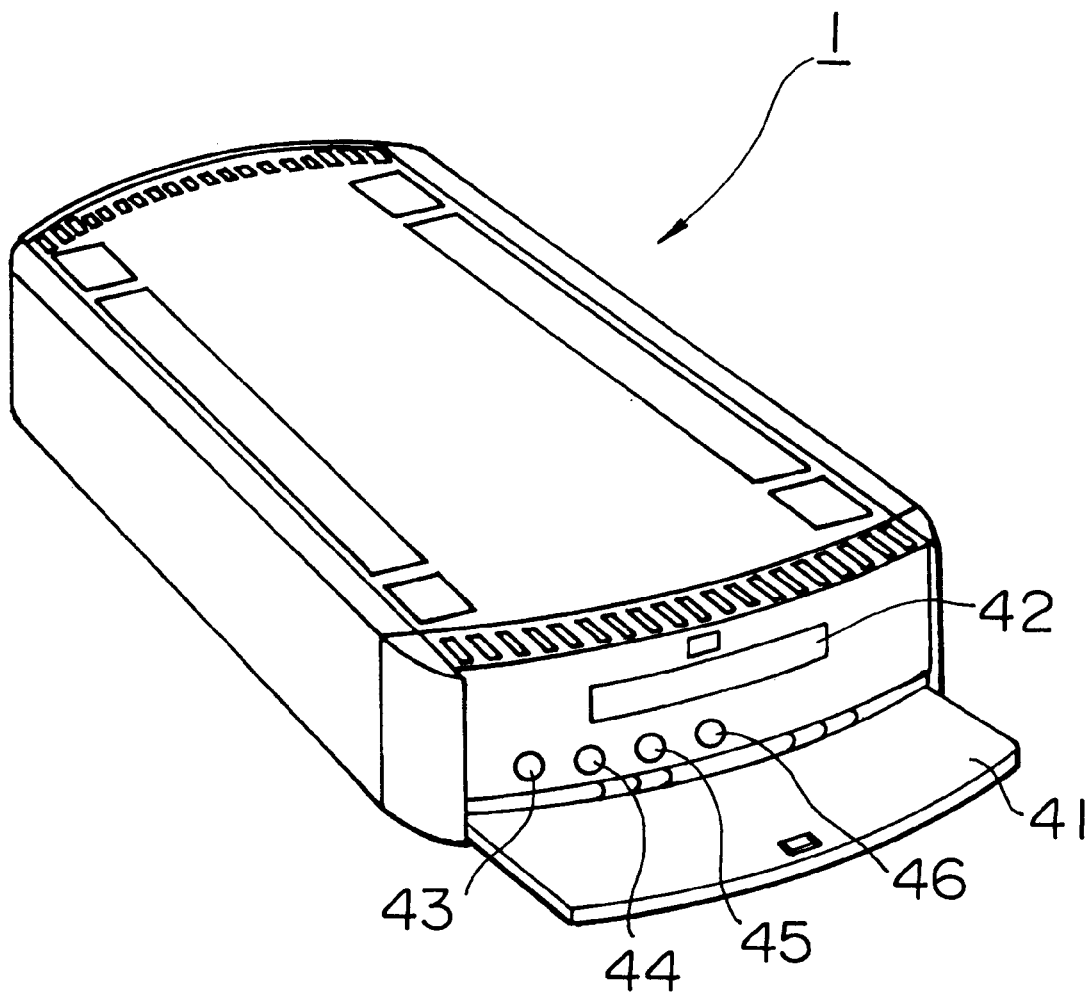
FIG. 4 is a perspective view of the personal computer with its rear door opened.

FIG. 4 shows the personal computer 1 with its rear door 41 opened. With the door 41 opened, a PC card slot 42 is seen. Disposed below the PC card slot 42 are a printer terminal 45 to be connected to a printer and a VGA terminal 46 for outputting computer graphics data, besides a USB terminal 43 and a 1394 terminal 44.

Figure 5:
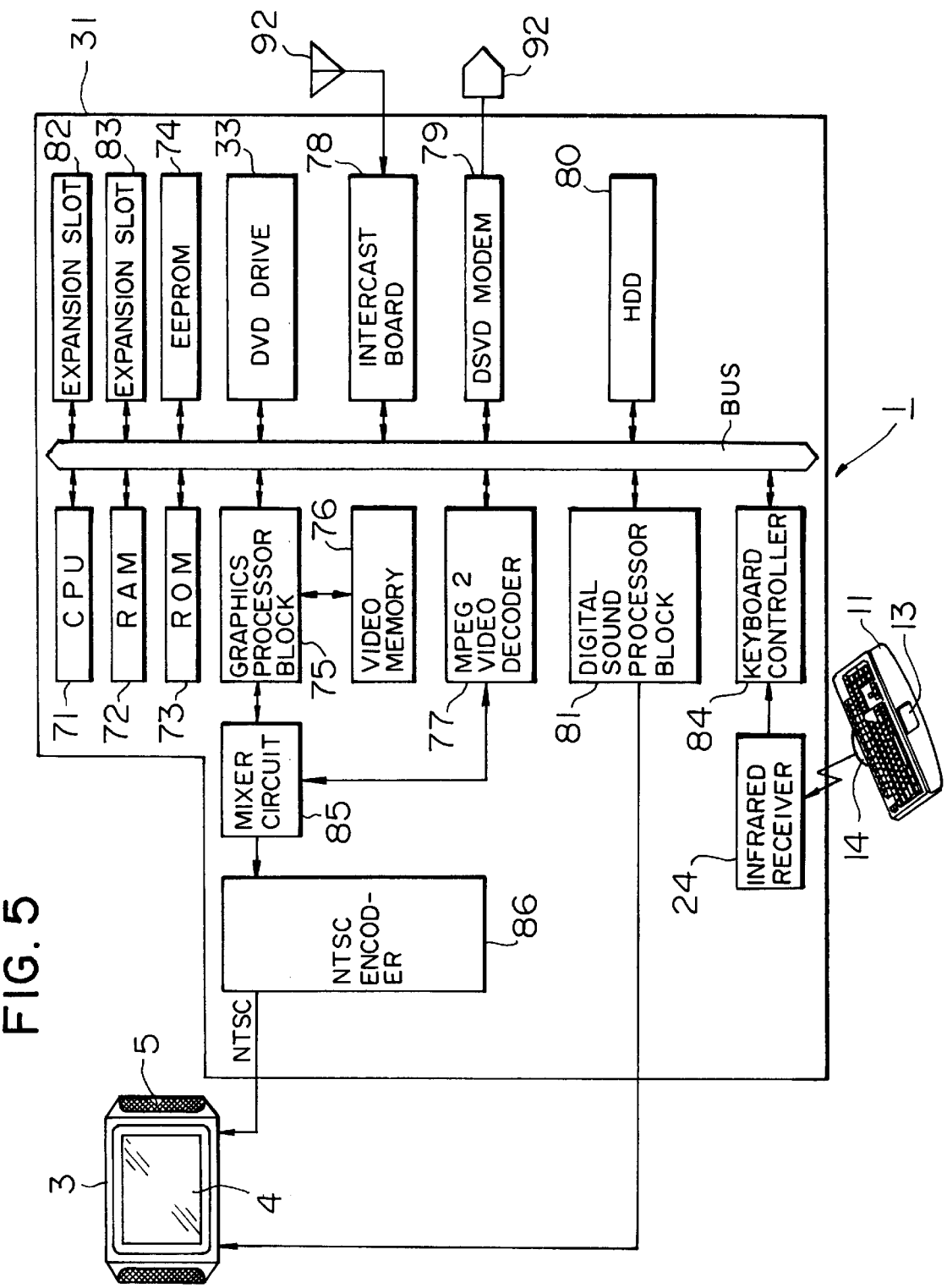
FIG. 5 is a block diagram of the internal construction of the personal computer of FIG. 1.

FIG. 5 is a block diagram of the internal construction of the personal computer 1. A CPU (Central Processing Unit) 71 may be a Pentium processor (Trade Mark) manufactured by Intel, for example. The CPU operates under its internal clock of 166 MHZ, or an external clock of 66 MHz. RAM 72 is a main memory of 16 MB, and stores data and programs executed by CPU 71 as appropriate. ROM 73 stores programs which CPU 71 executes to carry out a diversity of processes. EEPROM (Electrically Erasable Programmable Read Only Memory) 74 stores, as necessary, data that need to be stored even when power is removed from the personal computer 1.

A graphics processor block 75 performs moving picture processings (including color space conversion for converting a YUU signal in a moving picture data format to an RGB signal in a graphics signal data format and scaling (expansion or contraction) for presenting an image to a desired size), three-dimensional graphic processings (rasterization for projecting a three-dimensional object onto a two-dimensional plane, a Gouraud shading process for making an object have a more smooth look, and an alpha-blending process for presenting an translucent object), writes results of these processings to a video memory 76, and outputs them to a mixer circuit 85.

An MPEG2 video decoder 77 decodes data reproduced from a DVD by the DVD drive 33 and outputs the decoded data to the mixer circuit 85. A digital sound processor block 81 expands an ADPCM (Adaptive Difference Pulse Code Modulation) sound, expands MPEG audio data, synthesizes sound by frequency-modulating sound and special effect sound for reverberation (namely, producing an audio signal by synthesizing a plurality of sine waves having different frequencies and amplitudes), and synthesizes MIDI (Musical Instrument Digital Interface) wave tables. Synthesizing the MIDI wave table is to reproduce MIDI data using a built-in synthesizer based on a wave table that stores digital data, which is the sound component of each musical instrument. The audio signals thus individually processed are mixed by a built-in audio mixer, converted into an analog audio signal and output as a sound through the loudspeaker 5 in the television receiver 3.

A Intercast (Trade Mark) board 78 is used to receive an Intercast broadcast signal through an antenna 91 and demodulate it. In Intercast broadcasting, HTML (Hyper Text Markup Language) data serving as a basis for World Wide Web (WWW) page is inserted in vertical retrace period before transmission. Received data is stored in a hard disk driven by a hard disk drive (HDD) 80. By roaming HTML data on the hard disk drive 80, an operator acquires a pseudo-interactive environment.

More particularly, scores, still pictures of dramatic moments, and video clips may be broadcast in Intercast in sports programs, for example. The still pictures and video clips may be linked to associated information, and one can make access to acquire such associated information from a linked source via a telephone line. The Intercast was developed by Intel.

A DSVD (Digital Simultaneous Voice & Data) modem 79 is the DSVD system developed by Intel. The DSVD modem 79 time-division multiplexes a speech and data and transmits them via a modular jack 92 over a telephone line while demodulating and separating a DSVD signal input through the telephone line into a speech signal and data. In this method, a digitally compressed speech signal and an ordinary speech signal are multiplexed using a V. 43 protocol header. When no speech signal is present, the maximum transmission rate is 28.8 kbits/s, and when a speech signal is present, the maximum transmission rate is 19.2 kbits/s. The transmission rate of speech signal is 9.6 kbits/s. The compression and decompression method of the speech signal may be DitiTalk (Trade Mark) by Rockwell or TrueSpeech (Trade Mark) by DSP Group.

A keyboard controller 84 receives a signal from the infrared receiver 24, and feeds to CPU 71 a signal corresponding to the received signal.

The mixer circuit 85 mixes the output of the graphics processor block 75 and the output of the MPEG2 video decoder 77, as appropriate, and feeds the mixed signal to an NTSC encoder 86. The NTSC encoder 86 converts the video data fed by the mixer circuit 85 into an NTSC analog video signal, which is then fed to the television receiver 3.

Although FIG. 3 shows only one bus for convenience, the bus in practice includes a local bus connecting CPU 71 to RAM 72, an ISA (Industry Standard Architecture) bus connected to the keyboard controller 84, and a PCI (Peripheral Component Interconnect) bus for ROM 73, HDD 80 and the like. The ISA bus is an 8-bit bus or a 16-bit bus while the PCI bus is a 32-bit bus or a 64-bit bus. The PCI bus runs at a rate between 25 MHz to 66 MHz, and provides a throughput of 528 KB/s. This rate is 42nd times higher than that of the ISA bus.

An expansion slot 82 is for PCI bus, and an expansion slot 83 is for ISA bus. A desired function may be added by connecting a peripheral circuit (an SCSI board, for example).

Dedicated bus bridge circuits (not shown) are respectively arranged between the local bus and the PCI bus and between the PCI bus and the ISA bus.

Figure 6:
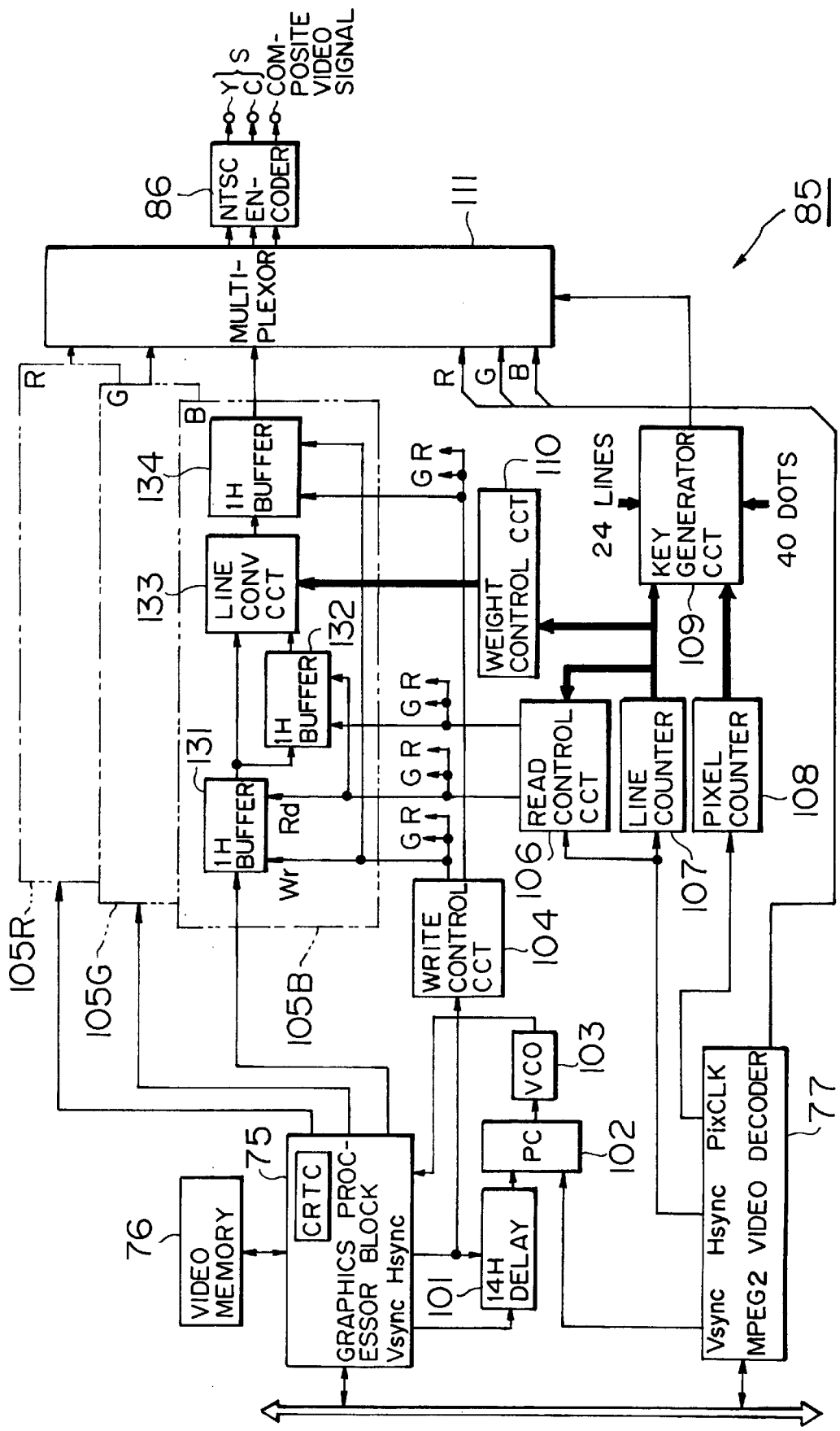
FIG. 6 is a block diagram of the mixer circuit shown in FIG. 5.

FIG. 6 is a block diagram of the mixer circuit 85. The vertical synchronizing signal (Vsync) output by the graphics processor block 75 is delayed by 14H (14 lines) by a delay circuit 101, and is then fed to a phase comparator circuit (PC) 102. The delay circuit 101 is provided with a horizontal synchronizing signal (Hsync) by the graphics processor block 75 to present a delay time of 14H.

The phase comparator circuit 102 is provided with a vertical synchronizing signal output by the MPEG2 video decoder 77. The phase comparator circuit 102 compares the vertical synchronizing signal the graphics processor block 75 feeds through the delay circuit 101 with the vertical synchronizing signal fed by the MPEG2 video decoder 77, and outputs a phase error between both to a voltage-controlled oscillator (VCO) 103. In response to the phase error fed by the phase comparator circuit 102, the voltage-controlled oscillator 103 generates a phase clock and outputs it to the graphics processor block 75.

A write control circuit 104 generates a write control signal in synchronization with the horizontal synchronizing signal fed by the graphics processor block 75, and outputs the write signal to 1H buffers 131, 132, and 134 in a processing circuit 105B. A read control circuit 106 generates a read control signal in synchronization with the horizontal signal fed by the MPEG2 video decoder 77, and outputs the read control signal to 1H buffers 131, 132, and 134 in the processing circuit 105B.

A line counter 107 counts the horizontal synchronizing signal output by the MPEG2 video decoder 77, and outputs its count to the read control circuit 106, a weight control circuit 110 and a key generator circuit 109. A pixel counter 108 counts a pixel clock (PixCLK) output by the MPEG2 video decoder 77, and outputs its count to the key generator circuit 109.

The weight control circuit 110 generates a weight for a count provided by the line counter 107, and outputs the weight to a line conversion circuit 133 in the processing circuit 105B. The key generator circuit 109 defaults to the values of 40 pixels (dots) and 24 lines as reference values. When the count from the pixel counter 108 and the count from the line counter 107 come to the predetermined relationship to the default reference values, the key generator circuit 109 outputs a predetermined key signal to a multiplexor 111.

In the processing circuit 105B, the 1H buffer 131 and 1H buffer 132 store blue pixel data for one line (1H) output by the graphics processor block 75, and output stored data to the line conversion circuit 133. In response to the weight fed by the weight control circuit 110, the line conversion circuit 133 processes the data from the 1H buffer 131 and 1H buffer 132, and outputs the processed data to the 1H buffer 134.

The data read from the 1H buffer 134 is supplied to the multiplexor 111.

The mixer circuit further comprises processing circuits 105R and 105G for processing the red and green pixel data respectively in addition to the processing circuit 105B for processing the blue pixel data. These circuit have the same circuit arrangement as that of the processing circuit 105B.

The multiplexor 111 mixes the R, G and B data for the VGA image from the processing circuits 105R, 105G, and 105B and the graphics processor block 75 with the R, G, and B data from the MPEG2 video decoder 77, and outputs the mixed data to the NTSC encoder 86.

Figure 7:
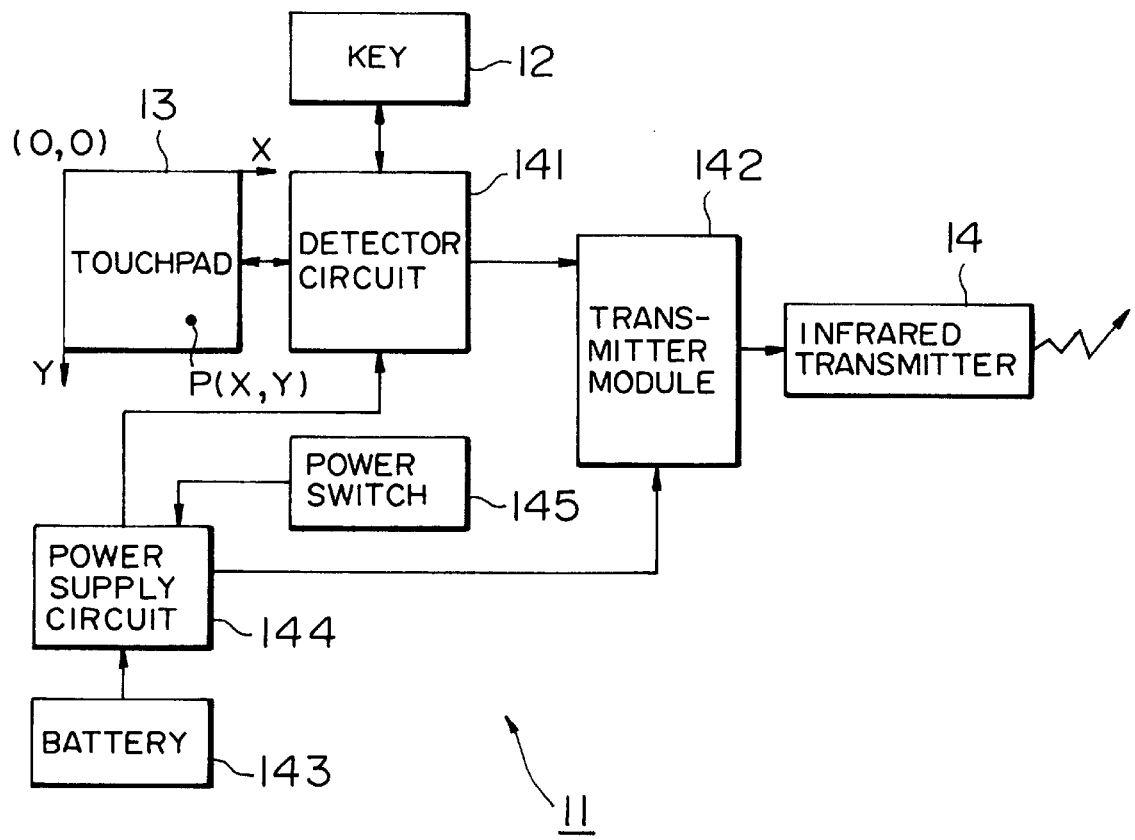
FIG. 7 is a block diagram of the internal construction of the keyboard shown in FIG. 1.

FIG. 7 shows the internal construction of the keyboard 11. A detector circuit 141 detects which one of keys 12 is operated. The detector circuit 141 also detects the coordinates (X, Y) of an activated point on the touchpad 13. The detector circuit 141 outputs the detected result to a transmitter module 142. The transmitter module 142 converts the input signal to a transmission signal, which is then fed to the infrared transmitter 14 to be transmitted as an infrared signal.

A battery 143 provides power to a power supply circuit 144. The power supply circuit 144 supplies required power to the detector circuit 141 and transmitter module 142. A power switch 145 is operated to start or stop the use of the keyboard 11.

The operation of the apparatus is now discussed. To reproduce a DVD, for example, a user opens the door 21 of the personal computer 1, and loads the unshown DVD to the DVD drive 33. The user operates the power switch 145 on the keyboard 11 to power the keyboard 11, and operates required keys of the keys 12 to command the DVD drive to reproduce the DVD.

The detector circuit 141 receives a signal from the key 12 activated, and outputs the detected signal in response to the key 12 to the transmitter module 142. The transmitter module 142 converts the detected signal into a transmission signal, which is then transmitted by the infrared transmitter 14 as an infrared signal to the personal computer 1.

The personal computer 1 receives the infrared signal at its infrared receiver 24. Upon detecting a signal output of the infrared receiver 24, the keyboard controller 84 outputs a signal responsive to the detected signal to CPU 71. In response to the input signal, CPU 71 controls the DVD drive 33 and starts the reproduction of the DVD.

Video data out of the data reproduced from the DVD is fed from the DVD drive 33 to the MPEG2 video decoder 77 to be decoded there. The data output by the MPEG2 video decoder 77 is fed to the NTSC encoder 86 via the multiplexor 111 of mixer circuit 85. The NTSC encoder 86 converts the input data into an analog NTSC signal, and outputs it to the television receiver 3 (TV monitor) to present it on the CRT 4. In this way, a MPEG2 image of 720×480 rectangular shaped pixels is presented in the regular roundness.

Audio data out of the data reproduced from the DVD is is input from the DVD drive 33 to the digital sound processor block 81 to be decoded there. The decoded data is D/A converted and is output to the loudspeaker 5 of the television receiver 3 from which a sound is emitted.

In this way the user enjoys programs recorded on the DVD using the television receiver 3.

To reproduce a computer graphics image, the user also operates the keyboard 11. In the same way as above, a command in infrared form is input to the personal computer 1 from the keyboard 11. In response to the command, CPU 71 controls the graphics processor block 75 to produce a VGA image data in a 640×480 pixel format. The R, G and B data of the VGA image output by the graphics processor block 75 are respectively supplied to the processing circuits 105R, 105G, and 105B.

The processing circuit 105B operates as follows. Since the processing circuits 105R, 105G operate in the same way as the processing circuit 105B, the operation of the processing circuit 105B only will be described herein.

The pixel data for a first line $L_1$ of the blue pixel data output by the graphics processor block 75 is stored in the 1H buffer 131. The pixel data for a next line $L_2$, when output, is stored in the 1H buffer 131. The pixel data for the line $L_1$ stored previously is transferred to the 1H buffer 132. In the same manner, third line data thereafter $L_3$, $L_4$, . . . are sequentially stored in the 1H buffers 131, 132.

The line conversion circuit 133 multiplies respectively two adjacent line data supplied by the 1H buffers 131, 132 by weights $w_1$ and $w_2$ supplied by the weight control circuit 110 and sums the results, thereby obtaining a new line $ML_i$. The weights $w_1$, $w_2$ vary as shown in FIG. 8.

Figure 8:
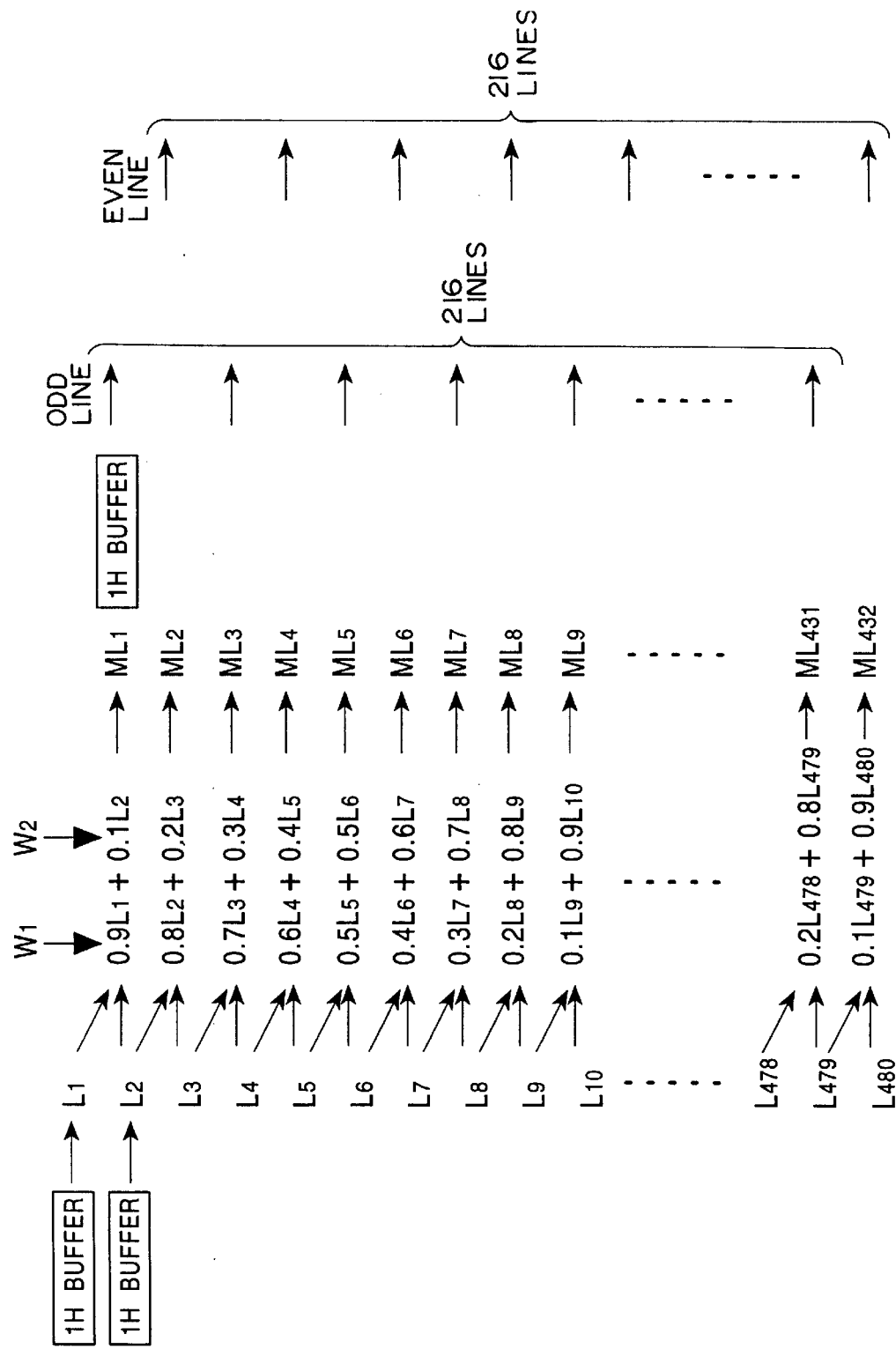
FIG. 8 is an explanatory view showing line number conversion operation.

More particularly, as shown in FIG. 8, the pixel data for the line $L_1$ output by the 1H buffer 132 is multiplied by 0.9 as the weight $w_1$, and the pixel data for the line $L_2$ output by the 1H buffer 131 is multiplied by 0.1 as the weight $w_2$. The output $ML_1$ of the line conversion circuit 133 is $0.9L_1 + 0.1L_2$.

When the 1H buffer 132 outputs the line $L_2$ and the 1H buffer 131 outputs the line $L_3$, the weights $w_1$, $w_2$ are respectively 0.8 and 0.2. The output $ML_2$ of the line conversion circuit 133 is thus $0.8L_2 + 0.2L_3$.

Furthermore in the same manner as above, the weight $w_1$ is decremented by 0.1 every line and the weight $w_2$ is incremented by 0.1 every line. Nine lines $ML_1$ through $ML_9$ are derived from lines $L_1$ through line $L_{10}$. In the process shown in FIG. 8, the same step is repeated every 10 lines. In this way, 432 lines (=480×9/10) lines are produced from the 480 lines in the graphics image.

Among the data for the 432 lines output by the line conversion circuit 133, data for a total of 216 lines of odd-numbered lines $ML_1$, $ML_3$, $ML_5$, $ML_7$, . . . are written onto the next stage 1H buffer 134 in the odd field. In the even field, data for a total of 216 lines of even-numbered lines $ML_2$, $ML_4$, $ML_6$, $ML_8$, . . . are written onto the 1H buffer 134. In other words, the non-interlaced VGA image data is converted into interlaced data.

The data of the 216 lines read from the 1H buffer 134 in each field are input to the multiplexor 111. The multiplexor 111 superimposes the data onto the data of the MPEG2 image, when provided by the MPEG2 video decoder 77, before feeding them to the NTSC encoder 86. When no MPEG2 image is provided, the multiplexor 111 directly feed the data from the 1H buffer 134 to the NTSC encoder 86. As already described, the NTSC encoder 86 converts the input data into an NTSC signal, and outputs it to the television receiver 3 to present it on the CRT 4.

Figure 9:
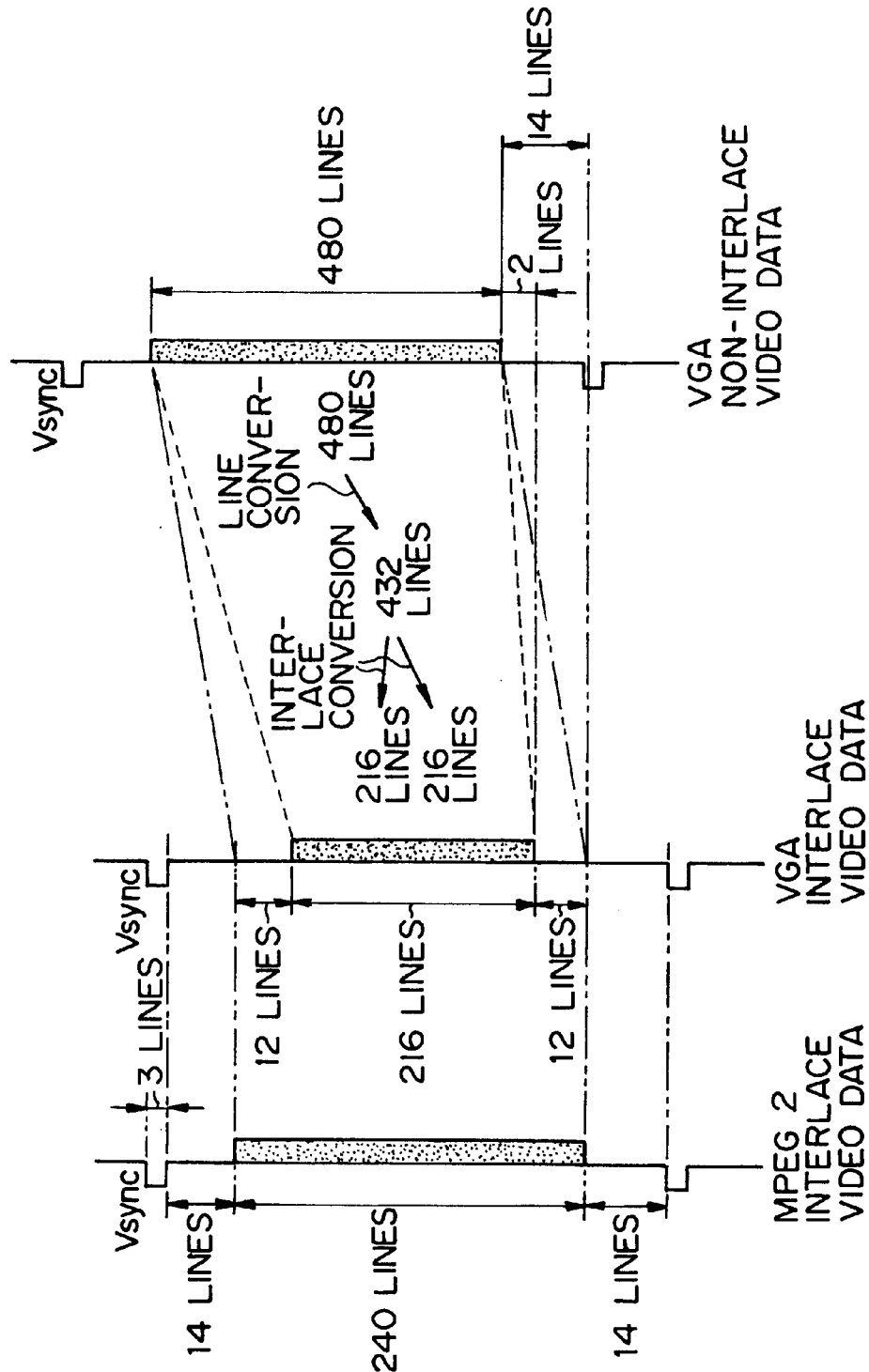
FIG. 9 is an explanatory view showing the timings of the vertical synchronizing signal of an MPEG2 image and the vertical synchronizing signal of a VGA image.

In the MPEG2 field as shown in FIG. 9, 240 lines are arranged except for 14 lines after one vertical synchronizing signal and 14 lines before a next vertical synchronizing signal while the 216 lines in one field in the interlaced VGA scanning system are arranged with the first 12 lines and the last 12 lines removed from the 240 lines in the MPEG2 image. The key generator circuit 109 gives no control signal when the count (representing the line number in the MPEG2 image) of the key generator circuit 109 falls within a range of 0 through 12, namely half a default reference value of 24, and within a range of 229 through 240. The key generator circuit 109 outputs its control signal to the multiplexor 111 when the count falls within a range of 13 through 228. The multiplexor 111 outputs the interlaced VGA image data supplied from the processing circuits 105R, 105G and 105B to the NTSC encoder 86 when the multiplexor 111 receives the control signal from the key generator circuit 109.

Figure 13:
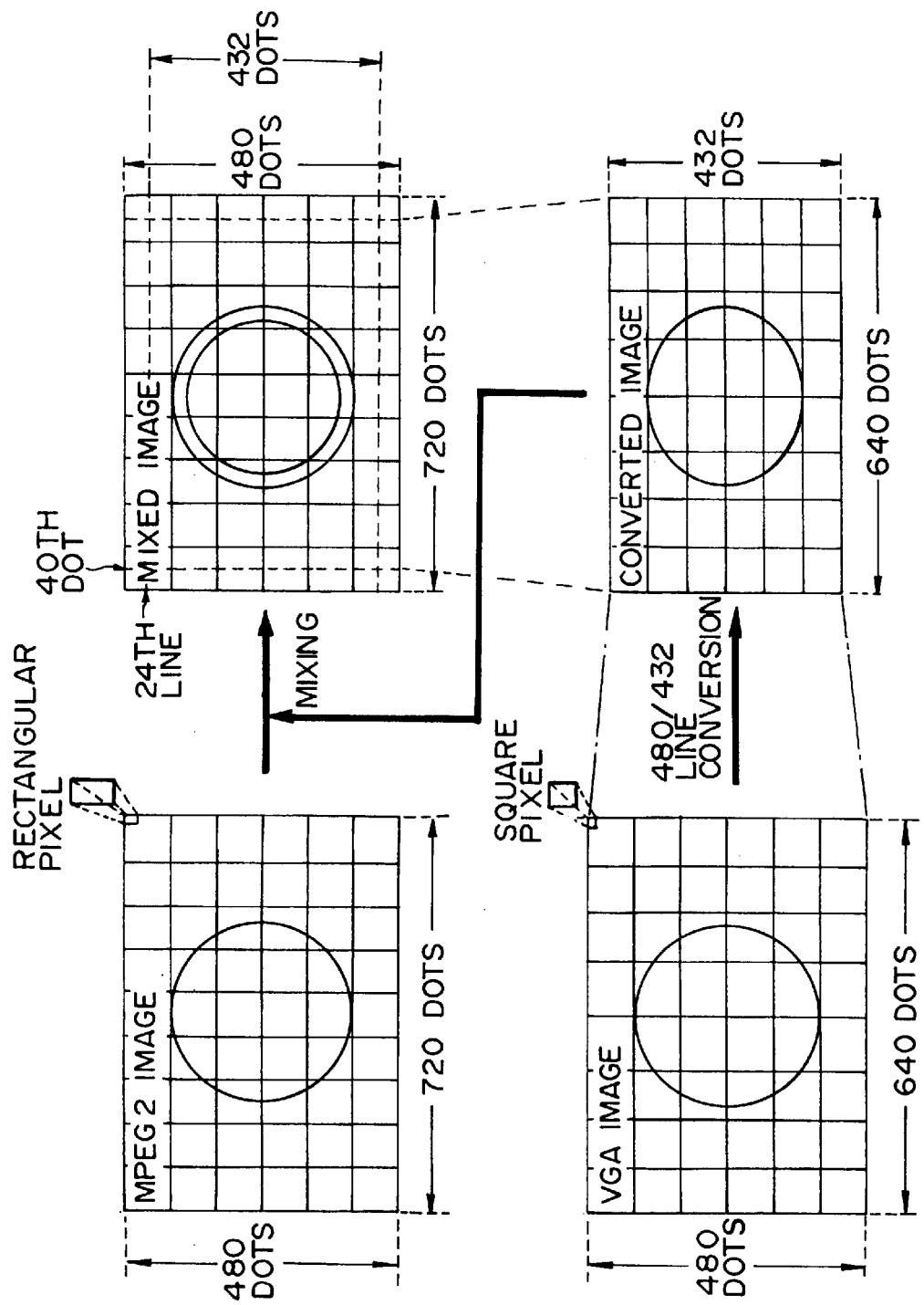
FIG. 13 shows the principle on which the MPEG2 image and VGA image are mixed in the regular roundness.
Figure 14:
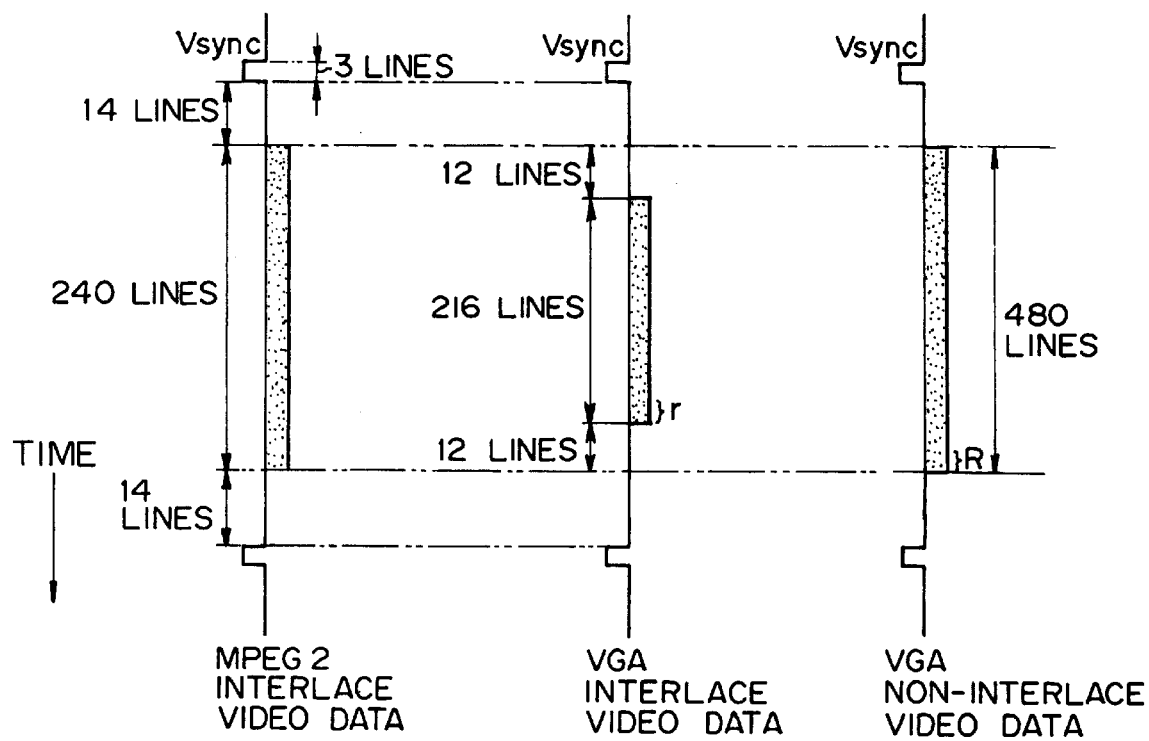
FIG. 14 is an explanatory view showing the timings of the vertical synchronizing signal of the MPEG2 image and VGA image.

Since the number of pixels per line in the VGA image is 640 as shown in FIG. 13, no corresponding pixel data in the VGA image is present at the timings of the first 40 pixels and the last 40 pixels of the 720 pixels constituting the MPEG2 image. The key generator circuit 109 gives no control signals when the count (representing the pixel number for each line in the MPEG2 image) of the pixel counter 108 falls within a range up to 40 and a range of 641 and over. The key generator circuit 109 gives a control signal when the count falls within a range of 41 through 680. In response to the control signal, the multiplexor 111 feeds the pixel data for the 640 VGA pixels on each horizontal scan to the NTSC encoder 86.

As already described with reference to FIG. 8, the processing circuits 105R, 105G and 105B need beforehand to collect data on two lines $L_{479}$, $L_{480}$ to derive a new line $L_{432}$. As shown in FIG. 6, however, the processing circuits 105R, 105G, and 105B are not provided with frame memories. The 1H buffers 131, 132 for two lines only are provided in front of the line conversion circuit 133. In the embodiment shown in FIG. 6, the timing of the generation of the vertical synchronizing signal in the non-interlaced VGA image at the graphics processor block 75 is set to be earlier by 14 lines than the timing of the generation of the vertical synchronizing signal in the interlaced MPEG2 image, so that the last line of the 480 lines in the non-interlaced VGA image is supplied at the timing two lines earlier than the timing of the last line of the 216 lines in the interlaced VGA image.

To this end, the mixer circuit 85 shown in FIG. 6 causes the delay circuit 101 to delay by 14 lines the vertical synchronizing signal in the VGA image output by the graphics processor block 75, and feeds the delayed signal to the phase comparator circuit 102. The phase comparator circuit 102 generates a phase error signal that makes the delayed vertical synchronizing signal, delayed by 14 lines from the one provided by the graphics processor block 75, synchronize with the vertical synchronizing signal in the MPEG2 image. As shown in FIG. 9, the generation timing of the vertical synchronizing signal generated by the graphics processor block 75 is thus earlier by 14 lines than the vertical synchronizing signal produced by the MPEG2 video decoder 77.

At the timing the processing circuit 105B outputs the last line $ML_{431}$ of the 216 lines in the odd field (or the last line $ML_{432}$ of the 216 lines in the even field), the 1H buffers 131, 132 hold respectively lines $L_{479}$ and $L_{480}$. The line conversion circuit 133 is prevented from failing in its line number conversion process (failing to produce a line $ML_t$) because of lack of data, and performs line number conversion on a real-time basis.

In the above embodiment, the delay circuit 101 adjusts the timings of the vertical synchronizing signals from the graphics processor block 75 and MPEG2 video decoder 77. Alternatively, in a register CRTC (CRT Controller) in the graphics processor block 75 to which various parameters are set, parameters may be set to generate internally a vertical synchronizing signal having a lead of 14 lines to the timing of the vertical synchronizing signal in synchronization with the clock supplied by the voltage-controlled oscillator 103.

Figure 10:
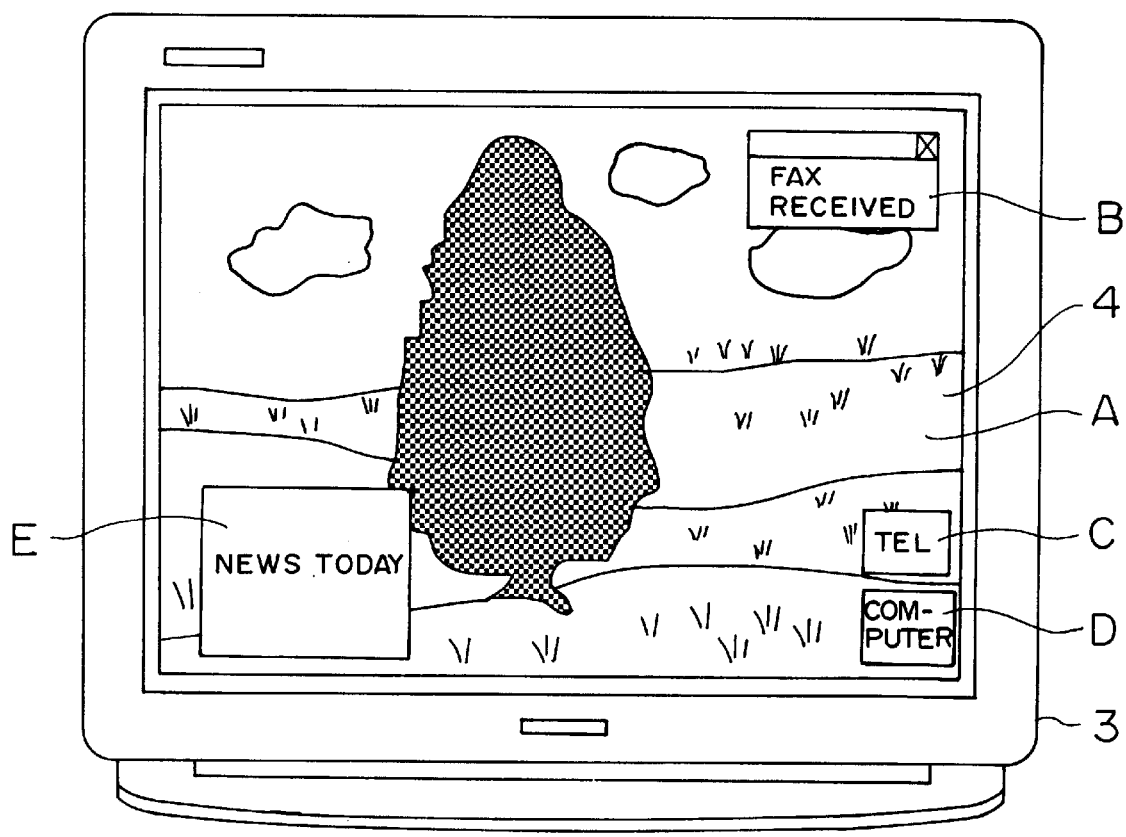
FIG. 10 shows examples of a graphics image and an MPEG2 image.
Figure 11:
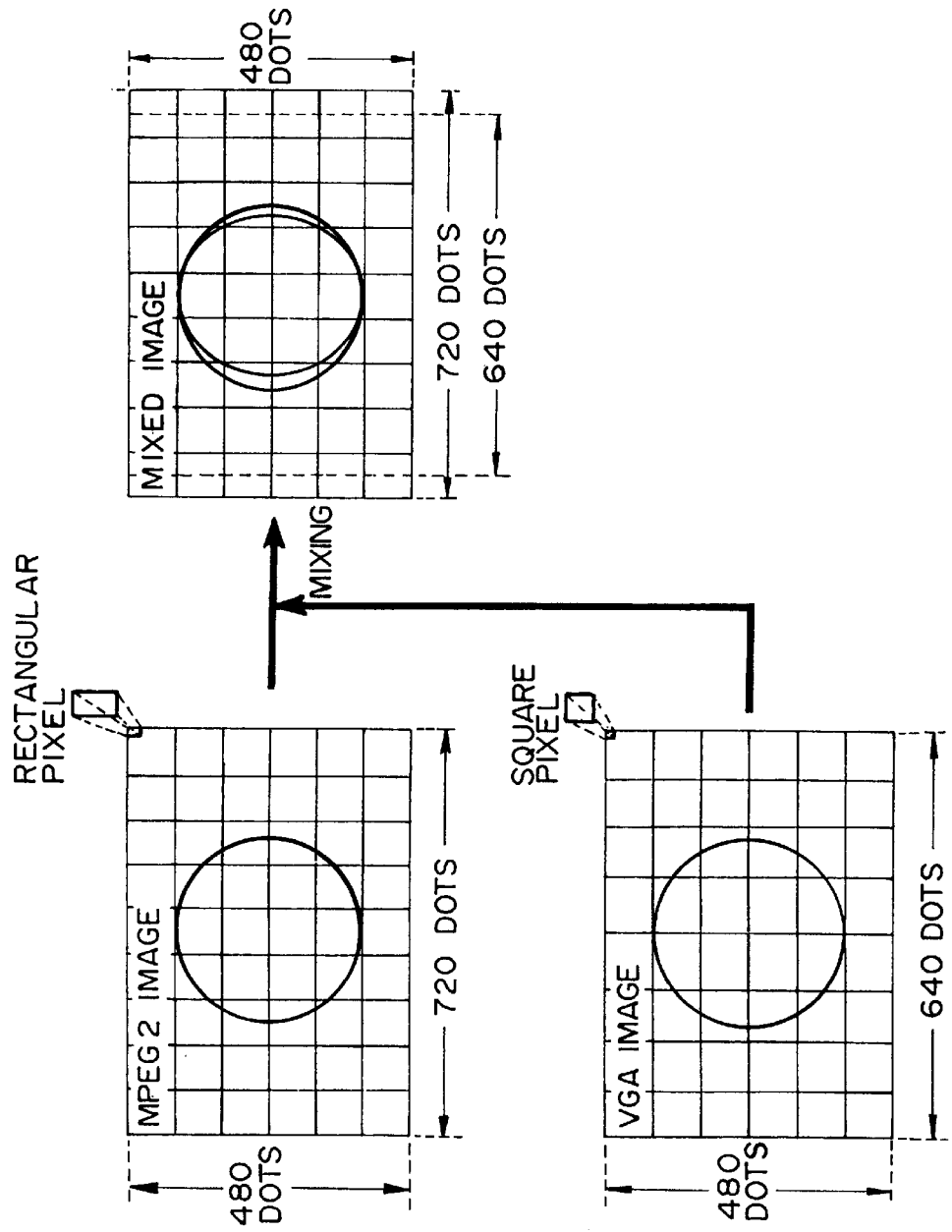
FIG. 11 is an explanatory view of the aspect ratios of the MPEG2 image and VGA image.
Figure 12A:
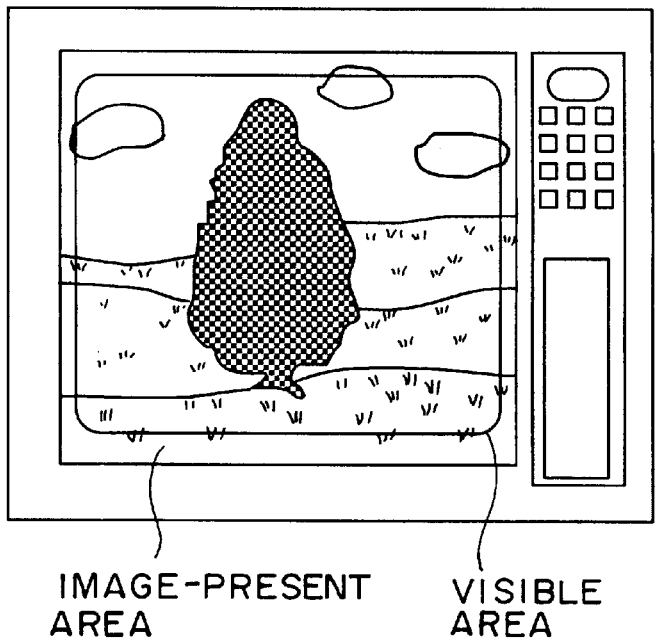
FIGS. 12A–12B are explanatory views showing the display areas of the graphics image and television image.
Figure 12B:
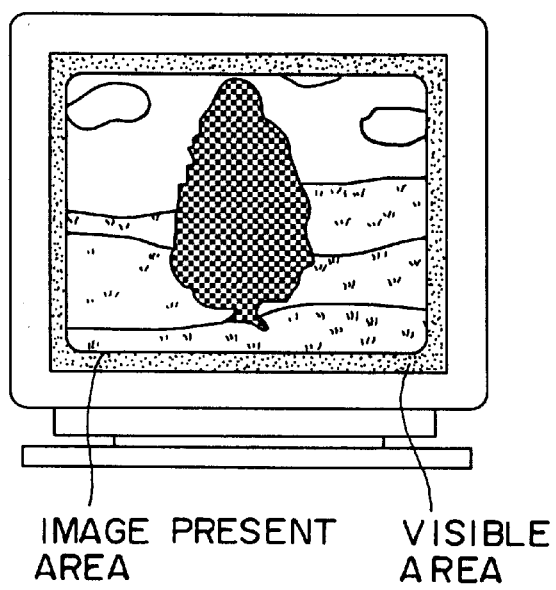

FIG. 10 shows examples of the display on the television receiver 3. The MPEG2 image output by the MPEG2 video decoder 77 is presented on an area A of the CRT 4 in a moving picture fashion. Presented on an area B is a window which is presented by an application software for a facsimile receiver under the control of CPU 71 during a facsimile reception time. The window now presents a message "FAX RECEIVED".

An area C presents an icon which may be clicked to initiate a telephone transmission/reception software. An area D presents an icon which may be clicked to open a window for presenting a folder or file present in a directory in the computer. An area E presents an inset screen (a reduced screen) for displaying a television picture received through the Intercast board 78 in a picture-in-picture fashion. The displays in areas B through E are all produced at the graphics processor block 75, and are presented. These pictures on these areas are presented at the regular roundness.

In the above embodiment, the graphics image is constructed of 640×480 pixels, while the MPEG2 image is constructed of 720×480 pixels. The number of pixels is not limited to these numbers. The aspect ratios are not limited to the above-described ones.

In the image displaying and controlling apparatus and method respectively according to the first and second aspects of the present invention, the pixel data for line number conversion is stored on a line by line basis, and the first image is presented as the second image at the regular roundness.

What is claimed is:

1. An image displaying and controlling apparatus for formatting a first image having a first aspect ratio for display as a second image having a second aspect ratio, said apparatus comprising:

memory means for storing pixel data of said first image on a unit of horizontal line basis;

line number converter means for converting line number comprising one display image of said first image so as to format said first image in said second aspect ratio by combining pixel data of at least two lines stored in said memory means in accordance with a programmable weighting factor; and timing controller means for controlling storing operation timing of said memory means so that said first image is not broken down in converting process by said line number converter means, wherein said timing controller means controls the storing operation on a unit of horizontal line basis so that the line form of pixel data read from said memory means is to be a line format of an interlace scanning system, and wherein said first image comprises 480 lines on a noninterlace scanning system;

said second image comprises 480 lines on the interlace scanning system;

said memory means stores pixel data for two lines;

said line number converter means converts 480 lines to 432 lines by processing said pixel data for two lines; and said timing controller means controls starting timing for said first image so as to be 14 lines earlier than the starting timing of said second image.

2. An image displaying and controlling method for formatting a first image having a first aspect ratio for display as a second image having a second aspect ratio, said method comprising the steps of:

storing pixel data of said first image on a unit of horizontal line basis:

converting line number comprising one display image of said first image so as to format said first image in said second aspect ratio by combining pixel data of at least two lines stored in said storing step in accordance with a programmable weighting factor; and controlling storing operation timing of said storing step so that said first image is not broken down in converting process in said converting step, wherein said controlling step includes timing controlling of the storing operation on a unit of horizontal line basis so that the line form of pixel data read from memory means is to be a line format of an interlace scanning system, wherein said first image comprises 480 lines on a noninterlace scanning system;

said second image comprises 480 lines on an interlace scanning system;

pixel data for two lines are stored in said storing step;

480 lines are converted to 432 lines by processing said pixel data for two lines in said converting step; and starting timing for said first image is controlled so as to be 14 lines earlier than the starting timing of said second image in said controlling step.

3. An image displaying and controlling apparatus for formatting a first image having a first aspect ratio for display as a second image having a second aspect ratio, said apparatus comprising:

memory means for storing pixel data of said first image on a unit of horizontal line basis;

line number converter means for converting line number comprising one display image of said first image so as to display said first image in said second aspect ratio by processing pixel data of at least two lines stored in said memory means; and timing controller means for controlling storing operation timing of said memory means so that said first image is not broken down in converting process by said line number converter means, wherein said timing controller means controls the storing operation on a unit of horizontal line basis so that the line form of pixel data read from said memory means is to be a line format of interlace scanning system said first image comprises 480 lines on noninterlace scanning system;

said second image comprises 480 lines on interlace scanning system;

said memory means stores pixel data for two lines;

said line number converter means converts 480 lines to 432 lines by processing said pixel data for two lines; and said timing controller means controls starting timing for said first image so as to be 14 lines earlier than the starting timing of said second image.

4. An image displaying and controlling method for formatting a first image having a first aspect ratio for display as a second image having a second aspect ratio, said method comprising the steps of:

storing pixel data of said first image on a unit of horizontal line basis;

converting line number comprising one display image of said first image so as to display said first image in said second aspect ratio by processing pixel data of at least two lines stored in said storing step; and controlling storing operation timing of said storing step so that said first image is not broken down in converting process in said converting step wherein said controlling step includes timing controlling of the storing operation on a unit of horizontal line basis so that the line form of pixel data read from memory means is to be a line format of interlace scanning system;

said first image comprises 480 lines on noninterlace scanning system;

said second image comprises 480 lines on interlace scanning system;

pixel data for two lines are stored in said storing step;

480 lines are converted to 432 lines by processing said pixel data for two lines in said converting step; and starting timing for said first image is controlled so as to be 14 lines earlier than the starting timing of said second image in said controlling step.

5. An image displaying and controlling apparatus for formatting a first image having a first aspect ratio for display as a second image having a second aspect ratio, said apparatus comprising:

memory means for storing pixel data of said first image on a unit of horizontal line basis;

line number converter means for converting line number comprising one display image of said first image so as to display said first image in said second aspect ratio by processing pixel data of at least two lines stored in said memory means; and timing controller means for controlling storing operation timing of said memory means so that said first image is not broken down in converting process by said line number converter means, wherein said timing controller means controls the storing operation on a unit of horizontal line basis so that the line form of pixel data read from said memory means is to be a line format of interlace scanning system said first image comprises a first number of lines on noninterlace scanning system;

said second image comprises a first number of lines on interlace scanning system;

said memory means stores pixel data for two lines;

said line number converter means converts a first number of lines to a second number of lines lower than said first number by processing said pixel data for two lines; and said timing controller means controls starting timing for said first image so as to be earlier than the starting timing of said second image.

6. An image displaying and controlling method for formatting a first image having a first aspect ratio for display as a second image having a second aspect ratio, said method comprising the steps of:

storing pixel data of said first image on a unit of horizontal line basis;

converting line number comprising one display image of said first image so as to display said first image in said second aspect ratio by processing pixel data of at least two lines stored in said storing step; and controlling storing operation timing of said storing step so that said first image is not broken down in converting process in said converting step wherein said controlling step includes timing controlling of the storing operation on a unit of horizontal line basis so that the line form of pixel data read from memory means is to be a line format of interlace scanning system;

said first image comprises a first number of lines on non-interlace scanning system;

said second image comprises a first number of lines on interlace scanning system;

pixel data for two lines are stored in said storing step;

a first number of lines are converted to a second number of lines, less than said first number of lines, by processing said pixel data for two lines in said converting step; and starting timing for said first image is controlled so as to be earlier than the starting timing of said second image in said controlling step.

* * * * *